United States Patent [19]
Kim et al.

[11] Patent Number: 6,069,537
[45] Date of Patent: May 30, 2000

[54] DOUBLE MODE MODULATOR

[75] Inventors: Ook Kim, Seoul; Jong Kee Kwon, Daejeon; Jong Ryul Lee, Daejeon; Chang Jun Oh, Daejeon; Won Chul Song, Daejeon; Kyung Soo Kim, Daejeon, all of Rep. of Korea

[73] Assignee: Electronics an Telecommunications Research Institute, Daejeon, Rep. of Korea

[21] Appl. No.: 09/124,142

[22] Filed: Jul. 29, 1998

[30] Foreign Application Priority Data

Nov. 26, 1997 [KR] Rep. of Korea ............. 97-63247

[51] Int. Cl.[7] ................................... H04L 27/32
[52] U.S. Cl. .................. 332/119; 455/553; 455/102; 455/110; 375/216; 332/103; 332/117
[58] Field of Search .................. 332/119, 117, 332/103; 375/216; 455/93, 102, 553, 110

[56] References Cited

U.S. PATENT DOCUMENTS

| | | | |
|---|---|---|---|
| 3,931,588 | 1/1976 | Gehweiler | 331/57 |
| 5,039,893 | 8/1991 | Tomisawa | 327/276 |
| 5,228,074 | 7/1993 | Mizikovsky | 455/553 |
| 5,446,422 | 8/1995 | Mattila et al. | 332/103 |
| 5,764,692 | 6/1998 | Mucke | 332/119 X |

*Primary Examiner*—Arnold Kinkead
*Attorney, Agent, or Firm*—Cohen, Pontani, Lieberman & Pavane

[57] ABSTRACT

A double mode modulator, particularly, for a portable telephone, which is adapted to realize both digital and analog modulations and have a low phase noise and a reduced locking time with a device readily integrated in an integrated circuit, including: a frequency synthesizer for synthesizing a particular frequency from an external reference clock signal; a digital modulator for performing a quadrature modulation for an output signal of the frequency synthesizer; and an analog modulator for performing a frequency modulation for the output signal of the frequency synthesizer.

3 Claims, 3 Drawing Sheets

DOUBLE MODE MODULATOR

BACKGROUND OF THE INVENTION

1. Field of the Invention

The present invention generally relates to a double mode modulator and, more particularly, to a double mode modulator for portable telephones which is adapted to be capable of realizing both digital and analog modulations.

2. Description of the Prior Art

Recently, portable telephones have been greatly developed from analog telephones using the conventional FM (Frequency Modulation) method to digital telephones using the digital modulation method.

Nevertheless, a number of users still have a portable telephone of AMPS (Advanced Mobile Phone Service) relying upon the conventional analog frequency modulation method and there exist areas where only analog method is supported for portable telephones. It is thus general that telephones which support both the conventional analog method and the digital method are widely used.

As regulated in the EIA/TIA (Electronic Industry Association/Telecommunications Industry Association) Interlim IS-95, the double mode method of portable telephones may support both analog method using the narrow-band frequency modulation and digital method using the QPSK (Quadrature Phase Shift Keying) technique. Herein, the analog method is to transmit the user's voice or data signals modulated by the frequency modulation method at a frequency whose bandwidth is 30 KHz, while the digital method is to convert an analog signal to digital information and then transmit/receive it after a separate signal processing step.

The most widely used, conventional frequency modulation method is realized with the PLL (Phase Locked Loop) circuit including a voltage-controlled oscillator (hereinafter, referred to as "VCO"). FIG. 1 is a diagram illustrating such a conventional frequency modulation method.

As illustrated in FIG. 1, PLL 100 includes a FD (Frequency Divider) 111, a PFD (Phase Frequency Detector) 112, a CP (Charge Pump) 113, a LF (Loop Filter) 114 and a VCO 115. The PLL 100 is a device for generating a frequency shift based on a signal input voltage, with the input terminal of the VCO 115 is also connected to a separate modulation input.

The frequency divider 111 includes a frequency divider 111a for dividing a frequency by M (M is a constant), and a frequency divider 111b for dividing a frequency by N (N is a constant). The phase frequency detector 112 detects a phase difference between the two input signals received from the frequency divider 111. The charge pump 113 transfers charges to the loop filter 114 as much as the phase difference which is the result of the operation of the phase frequency detector 112. The loop filter 114 determines the frequency response characteristics with respect to a control signal for the VCO 115 by use of an error signal that corresponds to the phase difference. This loop filter 114 plays a very important role in determining the frequency characteristics of the entire frequency synthesizer. The VCO 115 is an oscillator whose oscillating frequency changes with an applied voltage varied.

The characteristics of the entire VCO 115 in this case normally is determined by the open loop gain of the PLL 100 to a great extent. That is, where the open loop gain is greater than unity, this change of the output frequency is offset by a feedback of the PLL itself with respect to an input modulated signal, and accordingly, it decreases with respect to the entire input modulated signal.

Such a case is simply illustrated in FIGS. 2 and 3.

FIG. 2 is a response curve of the open loop gain with respect to the frequency of the PLL, which plays an important part in determining the frequency response of the PLL.

FIG. 3 shows the characteristics of output frequency shift with respect to input signals in modulation, wherein $\omega 1$ is the frequency whose entire loop gain is unity, and the frequency having the loop gain greater than unity will not be modulated.

In case such a structure as shown in FIG. 1 is used in the frequency modulation, a cut-off frequency for low-frequency wave of the output modulated waves depends upon the loop bandwidth of the entire PLL.

On the other hand, the loop bandwidth of the PLL is determined by various factors including the characteristics of the entire circuit constituting this frequency synthesizer, such as VCO gain, PFD gain and the time constant of the loop filter. Accordingly, a cut-off frequency for low-frequency wave with respect to input signals varies according to the values of the respective devices, and it is difficult to realize the circuit which is adapted to perform an additional operation for adjustment in order to compensate for such variations.

Furthermore, it might be better to increase the loop bandwidth in order to obtain a low phase noise and a short locking time, in which case a desired frequency modulation is hard to realize properly because the cut-off frequency becomes higher.

The use of both digital and analog circuits which are separately constructed in realizing a portable telephone causes the cost and size of the telephone to increase. It is thus very important to realize a circuitry that supports the digital and analog methods simultaneously with minimum circuits.

PLL and varactor are generally used in realization of a frequency modulation circuit. With this respect, the frequency modulation circuit is constructed to modulate analog signals having frequency components down to less than several hundreds of hertz in order to satisfy the frequency characteristics of AMPS signals. To embody such a construction, the loop bandwidth of the PLL has to be less than several hundreds of hertz, and the frequency characteristics are required to be precisely adjusted to meet those of AMPS signals. These characteristics are determined by the time constant of external components and need separate adjustment with deviation of time constant between the devices. Moreover, such a frequency modulation circuit is constructed with components which is difficult to integrate in an integrated circuit, so that it arises a problem of an increase in the cost, power consumption and size of the portable telephone.

SUMMARY OF THE INVENTION

An object of the present invention is to provide a double mode modulator which is adapted to realize both analog and digital modulations.

Another object of the present invention is to provide a double mode modulator which obtains a time delaying circuit for a low phase noise and a short locking time.

Still another object of the present invention is to provide a double mode modulator which is available for a low-price, low-power and small-sized portable telephone composed of devices that are easy to integrate in an integrated circuit.

According to one aspect of the present invention, a double mode modulator includes: a frequency synthesizer for synthesizing a particular frequency from an external reference clock signal; a digital modulator for performing a quadrature modulation for an output signal of the frequency synthesizer; and an analog modulator for performing a frequency modulation for the output signal of the frequency synthesizer.

The digital modulator includes: an inphase/quadrature phase signal generator for generating an inphase/quadrature phase signal upon receipt of the output signal of the frequency synthesizer; and a mixer for adding a value obtained by multiplying an output signal of the inphase/quadrature phase signal generator by an external inphase input signal to a value obtained by multiplying the output signal of the inphase/quadrature phase signal generator by an external quadrature phase input signal.

The analog modulator includes: a time delaying circuit for delaying time using the output signal of the frequency synthesizer as an input; and a time delay control section for controlling the time delay of the time delaying circuit.

Furthermore, the time delaying circuit includes one or more time delaying circuits connected in series with one another.

These and other advantages of the present invention will become apparent to those skilled in the art upon reading and understanding the following detailed description with reference to the accompanying figures.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
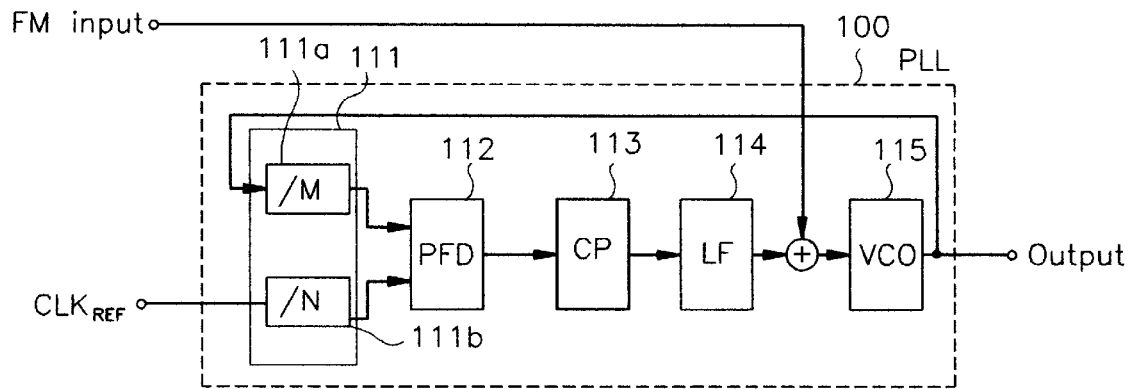
FIG. 1 is a diagram illustrating a conventional frequency modulation.
Figure 2:
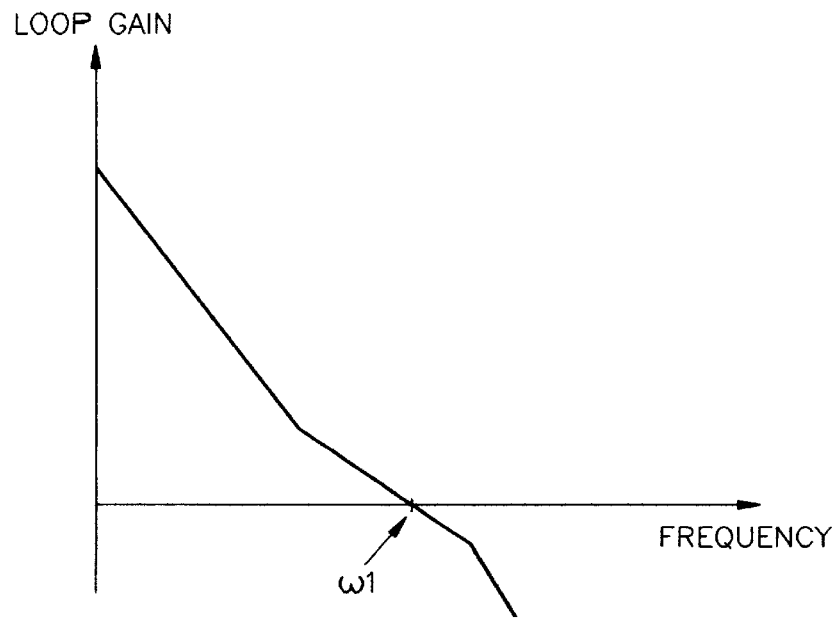
FIG. 2 is a response curve based on the frequencies of the PLL loop gain.
Figure 3:
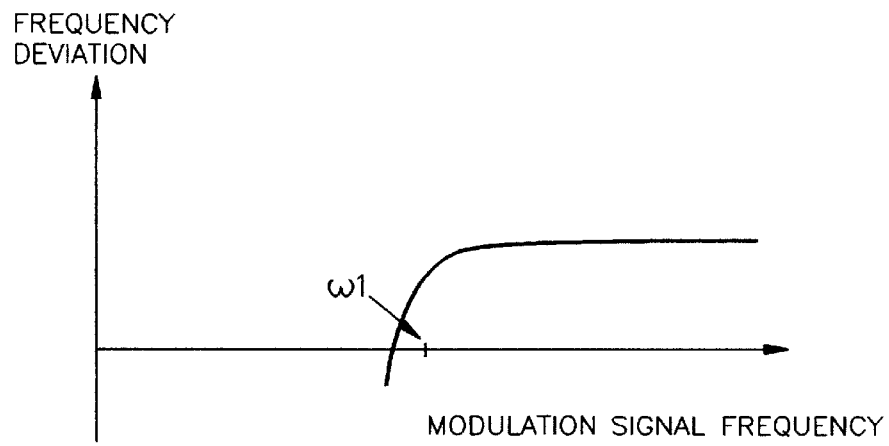
FIG. 3 is a graph showing the characteristics of the output frequency shift with respect to input signals in modulation.
Figure 4:
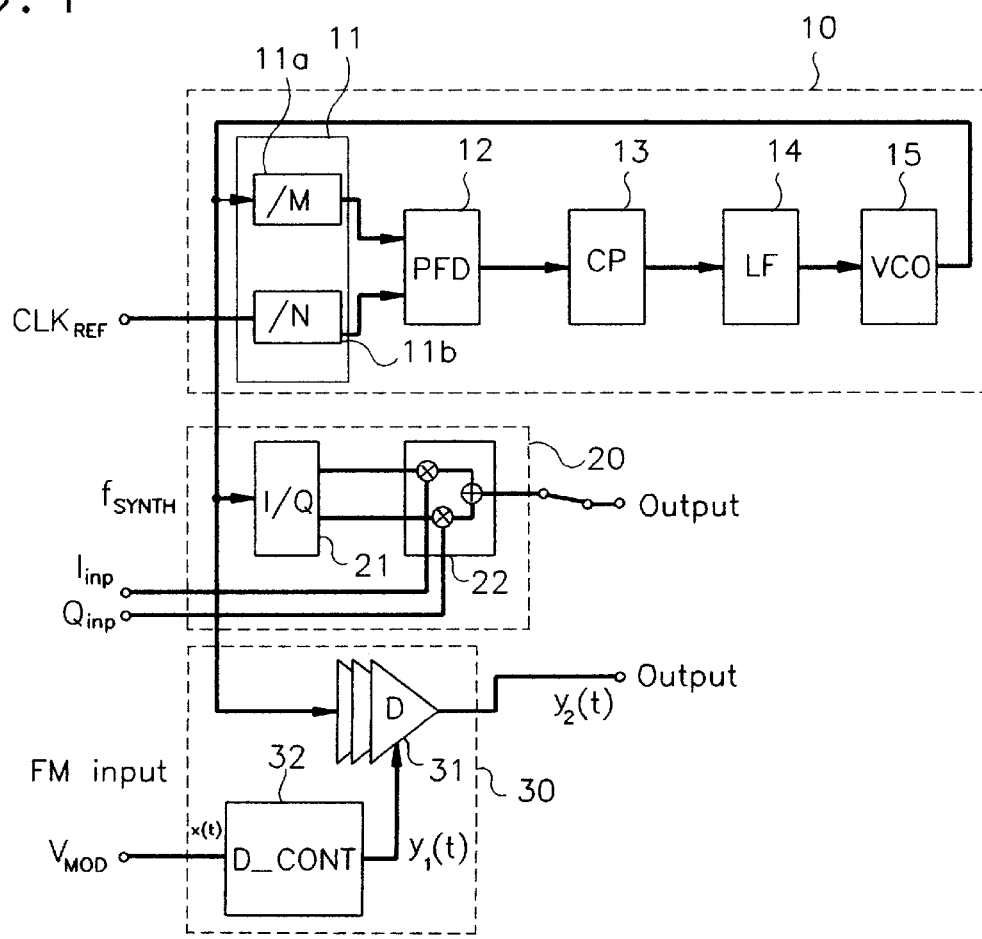
FIG. 4 is a diagram illustrating a double mode modulator in accordance with a preferred embodiment of the present invention.

FIG. 4 is an elementary circuit diagram of a double mode modulator in accordance with the present invention.

Referring to FIG. 4, a double mode modulator includes a frequency synthesizer 10, a digital modulator 20, and an analog modulator 30.

The frequency synthesizer 10 includes a frequency divider 11, a phase frequency detector 12, a charge pump 13, a loop filter 14, and a voltage-controlled oscillator 15, and synthesizes a particular frequency from an external reference clock signal. The signal generated from the frequency synthesizer 10 has a frequency $F_{SYNTH}$.

The frequency divider 11 includes a frequency divider 11a for dividing a frequency by M (M is a constant), and a frequency divider 11b for dividing a frequency by N (N is a constant). The phase frequency detector 12 detects a phase difference between the two input signals received from the frequency divider 11. The charge pump 13 transfers charges to the loop filter 14 as much as the phase difference which is the result of the operation of the phase frequency detector 12. The loop filter 14 determines frequency response characteristics with respect to a control signal for controlling the voltage-controlled oscillator 15 by means of an error signal that corresponds to the phase difference. This loop filter 14 has a very important function to determine the frequency characteristics of the entire frequency synthesizer. The voltage-controlled oscillator 15 is an oscillator whose oscillating frequency changes with an applied voltage varied. $CLK_{REF}$ is a reference clock input and the final frequency is synthesized based on the reference clock.

The digital modulator 20 includes an I/O (Inphase/Quadrature phase) signal generator 21 and a mixer 22. Herein, the I/Q signal generator 21 is a circuit for generating inphase and quadrature phase signals, and the mixer 22 is a circuit for adding a value obtained by multiplying the inphase signal from the I/Q signal generator 21 by an external inphase input signal to a value obtained by multiplying the quadrature phase from the I/Q signal generator 21 by an external quadrature phase input signal. The external inphase and quadrature phase input signals are generated from baseband input signals for digital modulation.

The analog modulator 30 includes a time delaying circuit 31 and a time delay control section 32. Since the time delaying circuit 31 has time delaying characteristics based on the input signals, the delayed time is determined by the input signal of the time delay control section 32. The time delaying circuit 31 can be realized with an elementary circuit, such as a differential circuit or a multivibrator for low-noise characteristics. Specially, it uses an optimum device which is easy to integrate in an integrated circuit. Furthermore, the time delaying circuit 31 includes a device having the time delay characteristics based on the input signal, and accordingly, it can be realized in a variety of ways. $V_{MOD}$, an input modulated signal is integrated at the time delay control section 32 which has a function of integration. The time delay control section 32 based on the input modulated signal may use a typical integration circuit, which are generally realized with resistances/capacitors and OP amplifiers. The time delay control section 32 may also be readily realized by the switch capacitor filter method which is suitable for ICs.

Such a double mode modulator performs digital modulation in case the output signal of the frequency synthesizer 10 is input in the I/Q signal generator 21, while it performs analog modulation when the output signal of the frequency synthesizer 10 is input in the time delaying circuit 31.

Figure 5:
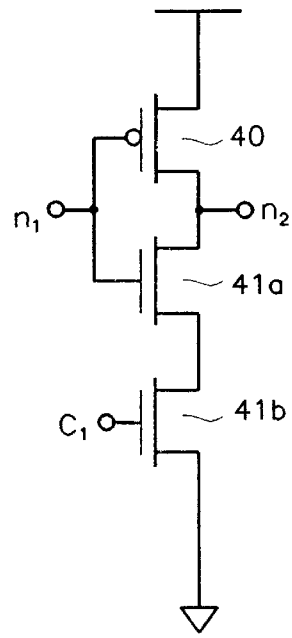
FIG. 5 is a circuit diagram illustrating a simple construction of a time delaying circuit.
Figure 6:
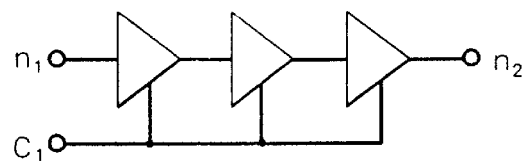
FIG. 6 is a circuit diagram illustrating a plurality of series time delaying circuits.

FIG. 5 shows a very simple construction of a time delaying circuit, which includes one p-channel transistor 40 and two n-channel transistors 41a and 41b. The time delaying component of this device is determined by a control signal c1 of the gate of the n-channel transistors. The delayed time decreases with an increase in the voltage of control signal c1, whereas it is increased with a decrease in the voltage of c1.

Where a single time delaying device is not sufficient to obtain a desired time-delayed value, it may be possible to arrange a plurality of time delaying devices in series for the time delaying circuit, as illustrated in FIG. 6.

Figure 7:
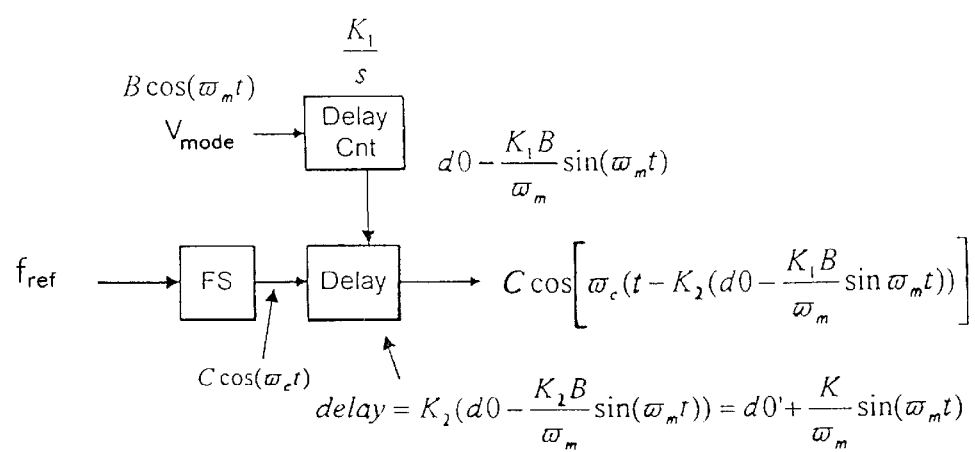
FIG. 7 is a diagram illustrating the principle of the frequency modulation.

The principle of frequency modulation will be described with reference to FIGS. 4 and 7.

Supposing that the synthesized signal from the frequency synthesizer 10 is C cos($\omega_c$t) and the frequency-modulated input signal is B cos($\omega_w$ t), an input signal of the time delay control section 32 such as that shown in FIG. 4 is given by Equation 1 and an output signal is given by Equation 2.

$$x(t) \cdot B \cos(\omega_w t) \qquad \text{Equation 1}$$

$$y_1(t) = d(x(t)) = d0 - \frac{K_1 B}{\omega_m} \sin(\omega_m t) \qquad \text{Equation 2}$$

Delaying the input signal C cos($\omega_m$t) yields $y_2$(t) such as that represented by Equation 3.

$$y_2(t) = D(y_1(t)) \qquad \text{Equation 3}$$

$$= C\cos\left(\omega_c\left(t - K_2\left(d0 - \frac{K_1 B}{\omega_m}\sin(\omega_m t)\right)\right)\right)$$

Herein, the frequency shift is given by Equation 4.

$$\Delta f = \frac{1}{2\pi}\frac{d\theta(t)}{dt} = \frac{1}{2\pi}[\omega_c K_1 K_2 B \cos(\omega_m t)] \qquad \text{Equation 4}$$

It is apparent from Equation 4 that the frequency shift is in proportion to the input signal.

Such as in the present invention as described above, the frequency modulation circuit performs frequency modulation based on synthesized signals from the frequency synthesizer. Accordingly, the frequency modulation circuit and the frequency synthesizer operate separately from each other, thereby making it possible to broaden the loop bandwidth of the frequency synthesizer.

According to the present invention, the characteristics of the frequency synthesizer and those of the digital and analog modulations are separately optimized, making the design of the circuit simple, whereby the performance of the circuit can be entirely optimized.

The double mode modulator of the present invention can be easily integrated because it is composed of devices and circuits which are easy to integrate in an integrated circuit.

Furthermore, external components are brought in an integrated circuit, reducing the number of used components to decrease the volume of the entire functional circuit and minimize external parasitic components that are not needed, thereby improving the stability of devices.

In particular, it is possible to regulate the loop bandwidth of the frequency synthesizer, permitting a frequency synthesizer having optimized phase noise characteristics to be realized with a device having a small time constant, so that almost all the devices can be built in an integrated circuit.

Normally, because the loop bandwidth of the frequency synthesizer is broaden, it is possible to synthesize a low-noise signal with a resonant circuit or other voltage-controlled circuits and also to use low-noise frequency synthesizers appropriate for the respective processes. Furthermore, the device can be readily integrated into an integrated circuit because of small time constant thereof.

As described above, although the present invention has been described in detail with reference to illustrative embodiments, the invention is not limited thereto and various modifications and changes may be effected by one skilled in the art within the scope of the invention.

What is claimed is:

1. A double mode modulator for supporting both analog frequency modulation and digital frequency modulation, comprising:

a frequency synthesizer for receiving an external reference clock signal, synthesizing a particular frequency from said external reference clock signal and outputting said synthesized particular frequency;

a digital modulator for receiving said output of said frequency synthesizer and performing a quadrative modulation; and an analog modulator for receiving said output of said frequency synthesizer and performing a frequency modulation;

wherein said digital modulator comprises:

an inphase/quadrative phase signal generator for receiving said output of said frequency synthesizer and generating an inphase/quadrative phase signal in response to said output signal; and a mixer for receiving said inphase/quadrative phase signal, an external inphase input signal and an external quadrative phase input signal and adding a first value comprising said inphase/quadrative phase signal multiplied by said external inphase input signal to a second value comprising said inphase/quadrative phase signal multiplied by said external quadrative phase input signal;

wherein said analog modulator comprises:

a time delaying circuit for receiving and delaying said output signal from said frequency synthesizer; and a time delay control section for controlling an amount of time delay of said time delaying circuit.

2. The double mode modulator of claim 1, wherein said time delaying circuit comprises a plurality of serially connected time delaying circuits.

3. The double mode modulator of claim 1, wherein said time delay control section receives an input modulated control signal, integrates said modulated control signal and uses said integrated value for controlling said amount of time delay.

* * * * *